US008083112B2

(12) United States Patent
Kuo

(10) Patent No.: US 8,083,112 B2
(45) Date of Patent: Dec. 27, 2011

(54) POSITIONING ASSEMBLY FOR A BICYCLE LOCK

(76) Inventor: Lambert Kuo, Tainan (TW)

( * ) Notice: Subject to any disclaimer, the term of this patent is extended or adjusted under 35 U.S.C. 154(b) by 625 days.

(21) Appl. No.: 12/329,715

(22) Filed: Dec. 8, 2008

(65) Prior Publication Data

US 2010/0139344 A1    Jun. 10, 2010

(51) Int. Cl.
*B62J 7/00* (2006.01)
*B62J 11/00* (2006.01)
*B60R 7/00* (2006.01)
*B62H 5/00* (2006.01)

(52) U.S. Cl. ........... 224/425; 224/547; 224/935; 70/233

(58) Field of Classification Search .................. 224/425, 224/420, 935, 412, 448, 419, 547, 548, 461; 70/233; 24/613
See application file for complete search history.

(56) References Cited

U.S. PATENT DOCUMENTS

| | | | | |
|---|---|---|---|---|
| 4,819,217 A * | 4/1989 | Houlihan | ........................ | 368/10 |
| 5,386,961 A * | 2/1995 | Lu | ............................ | 248/223.41 |
| 5,405,113 A * | 4/1995 | Jaw | ............................. | 248/229.1 |
| 5,669,536 A * | 9/1997 | Wang | ............................ | 224/443 |
| 5,704,526 A * | 1/1998 | Kuo | ............................... | 224/425 |
| 5,718,134 A * | 2/1998 | Chang | ............................. | 70/233 |
| 6,095,386 A * | 8/2000 | Kuo | ............................. | 224/448 |
| 6,422,442 B1* | 7/2002 | McDaid et al. | ............... | 224/441 |
| 6,557,808 B1* | 5/2003 | Ling | .......................... | 248/229.1 |
| 6,619,084 B2* | 9/2003 | Kuo | ............................... | 70/233 |
| 6,971,564 B2* | 12/2005 | Yang | ............................ | 224/425 |
| 7,311,233 B2* | 12/2007 | Chen | ............................. | 224/425 |
| 7,661,280 B1* | 2/2010 | Weyland | ........................ | 70/233 |
| 2003/0029209 A1* | 2/2003 | Kuo | ................................ | 70/233 |
| 2006/0124679 A1* | 6/2006 | Chen | ............................ | 224/425 |
| 2008/0035690 A1* | 2/2008 | Hsai | .............................. | 224/425 |

* cited by examiner

*Primary Examiner* — Justin Larson
*Assistant Examiner* — Lester L Vanterpool
(74) *Attorney, Agent, or Firm* — Frenkel & Associates, PC

(57) ABSTRACT

A positioning assembly for a bicycle lock has a positioning frame, a turning connector and a linking element. The positioning frame is detachably mounted on a bicycle and has a mounting segment and a controlling segment. The controlling segment is mounted on the mounting segment and has a base and two pressing devices. The base has two mounting recesses. The pressing devices are movably and respectively mounted in the mounting recesses of the base. The turning connector is pivotally and detachably connected to the positioning frame and has a pivotal segment and a linking segment. The pivotal segment has two engaging elements mounted in the mounting recesses of the base to engage the pressing devices. The linking segment is formed with the pivotal segment and has an inserting hole. The linking element is detachably connected to inserting hole of the turning connector.

16 Claims, 9 Drawing Sheets

POSITIONING ASSEMBLY FOR A BICYCLE LOCK

BACKGROUND OF THE INVENTION

1. Field of the Invention

The present invention relates to a positioning assembly, and more particularly to a positioning assembly for a bicycle lock to adjust the direction of the bicycle lock conveniently.

2. Description of Related Art

A bicycle lock can be used to prevent a bicycle from being stolen, and can be mounted on the bicycle with a conventional positioning assembly.

With reference FIG. 11, the conventional positioning assembly is detachably mounted on the bicycle and has a positioning frame (90) and a linking element (91). The positioning frame (90) is detachably mounted on a frame tube of the bicycle and has a front end, a rear end, a mounting segment (92) and a linking segment (93). The mounting segment (92) is formed on the front end of the positioning frame (90) and is mounted around the frame tube of the bicycle. The linking segment (93) is formed on the rear end of the positioning frame (90) and has a rear end and a linking recess. The linking recess is formed on the rear end of the linking segment (93). The linking element (91) is detachably connected to the linking segment (93) of the positioning frame (90) and has an inserting end and a connecting end. The inserting end of the linking element (91) is detachably inserted into the linking recess of the linking segment (93) of the positioning frame (90). The connecting end of the linking element (91) can connect a bicycle lock to the frame tube of the bicycle.

However, the linking segment (93) of the positioning frame (90) is formed and aligns with the mounting segment (92), but the direction of the linking segment (93) relative to the mounting segment (92) cannot be changed. Accordingly, to connect the linking element (91) to the linking segment (93) of the positioning frame (90) is easily obstructed by the bicycle lock, especially when the bicycle is parking at a narrow area. Therefore, the conventional positioning assembly is inconvenient in use and operation.

To overcome the shortcomings, the present invention provides a positioning assembly for a bicycle lock to mitigate or obviate the aforementioned problems.

SUMMARY OF THE INVENTION

The primary objective of the present invention is to provide a positioning assembly for a bicycle lock to adjust the direction of the bicycle lock conveniently.

The positioning assembly for a bicycle lock in accordance with the present invention has a positioning frame, a turning connector and a linking element. The positioning frame is detachably mounted on a bicycle and has a mounting segment and a controlling segment. The controlling segment is mounted on the mounting segment and has a base and two pressing devices. The base has two mounting recesses. The pressing devices are movably and respectively mounted in the mounting recesses of the base. The turning connector is pivotally and detachably connected to the positioning frame and has a pivotal segment and a linking segment. The pivotal segment has two engaging elements mounted in the mounting recesses of the base to the pressing devices. The linking segment is formed with the pivotal segment and has an inserting hole. The linking element is detachably connected to inserting hole of the turning connector.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
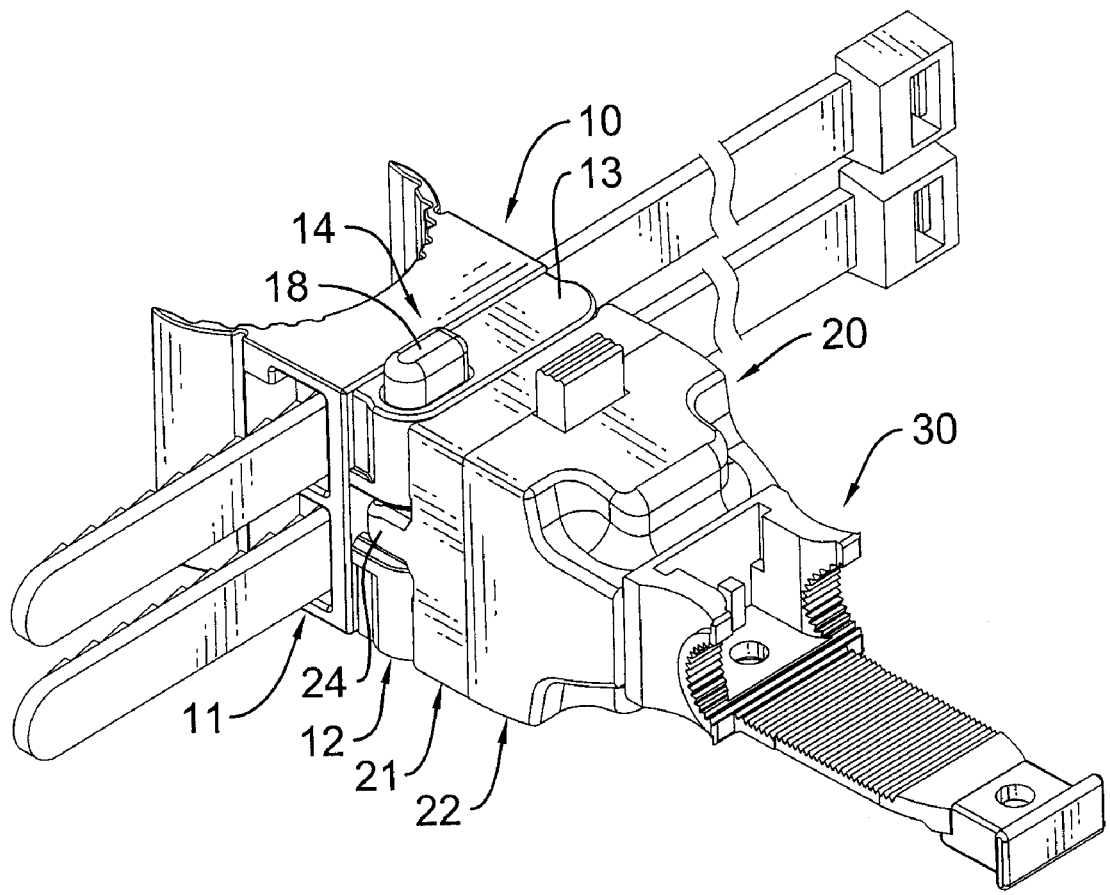
FIG. 1 is a perspective view of a first embodiment of a positioning assembly for a bicycle lock in accordance with the present invention.

With reference to FIGS. 1, 2, 6, 7 and 8, a positioning assembly for a bicycle lock in accordance with the present invention has a positioning frame (10), a turning connector (20) and a linking element (30).

The positioning frame (10) is detachably mounted on a bicycle and has a mounting segment (11) and a controlling segment (12).

Figure 7:
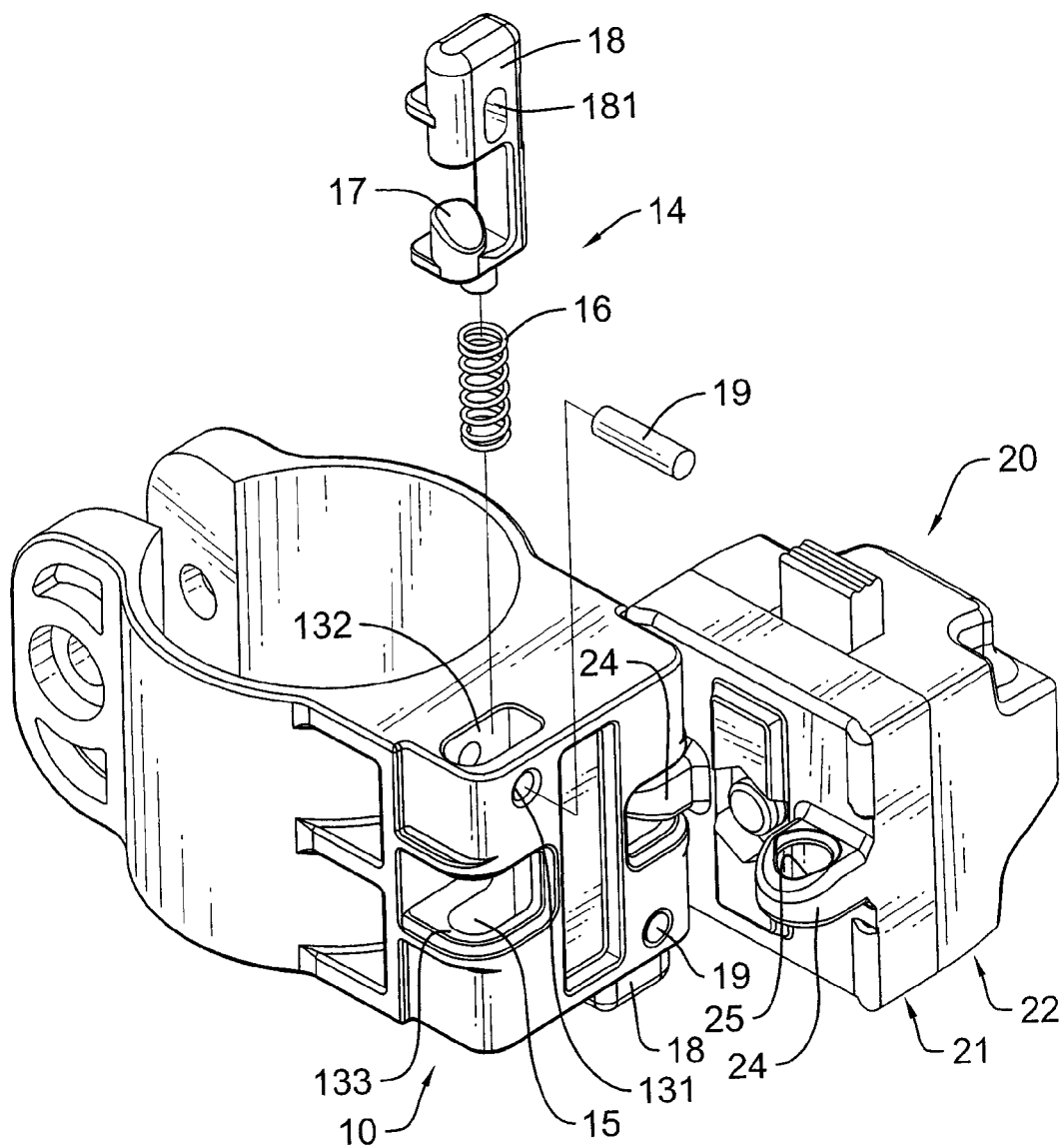
FIG. 7 is an exploded perspective view of a third embodiment of a positioning assembly for a bicycle lock in accordance with the present invention.

The mounting segment (11) is detachably mounted around a frame tube of the bicycle and has a front side and a rear side. The mounting segment (11) may have a belt mounted on the rear side and mounted around the frame tube or may have a C-shaped clamp formed on the front side and mounted around the frame tube of the bicycle by a fastener as shown in FIG. 7.

The controlling segment (12) is mounted or formed on the mounting segment (11) opposite to the belt or the clamp and has a base (13) and two pressing devices (14).

Figure 2:
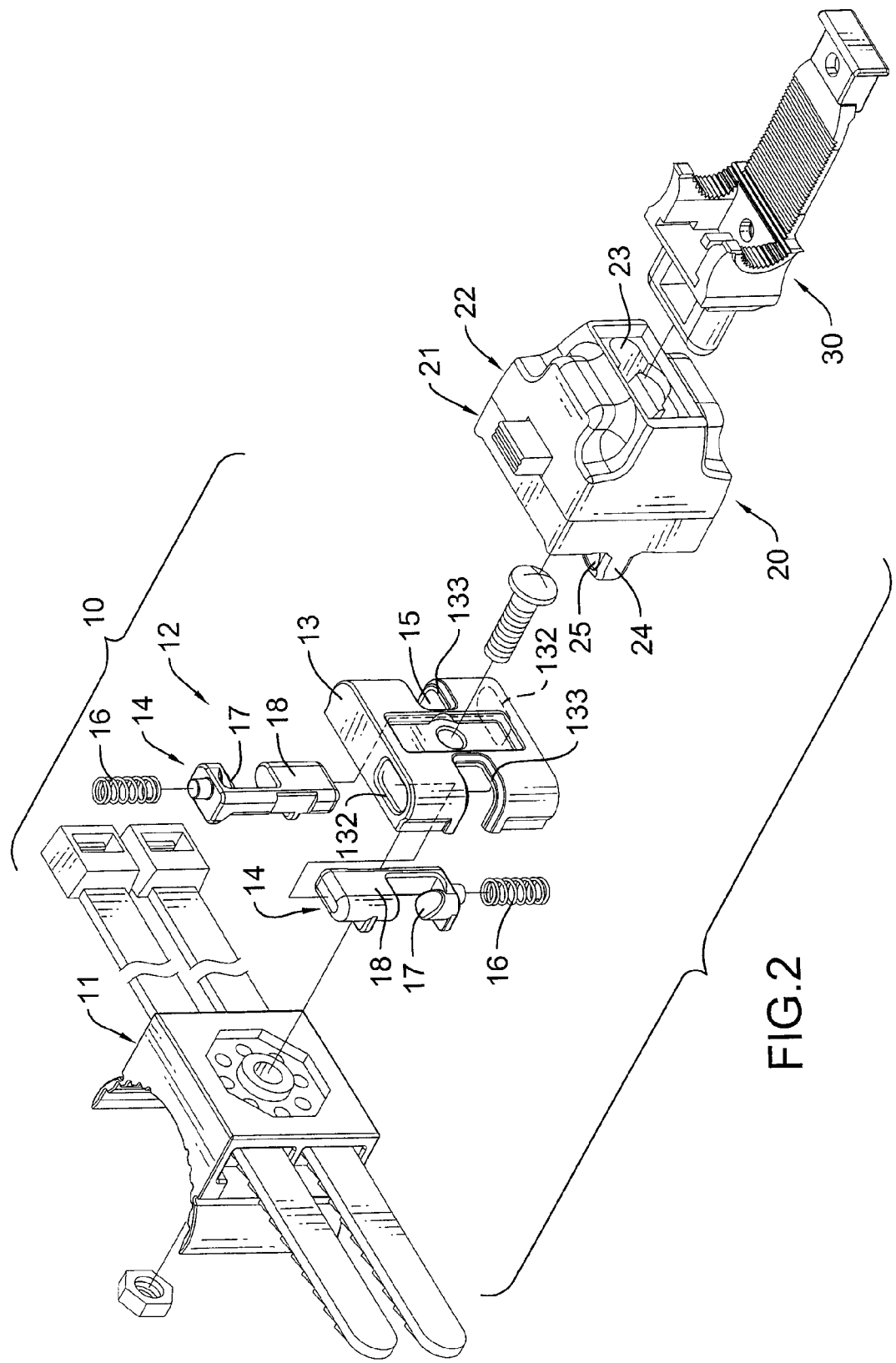
FIG. 2 is an exploded perspective view of the positioning assembly for a bicycle lock in FIG. 1.
Figure 9:
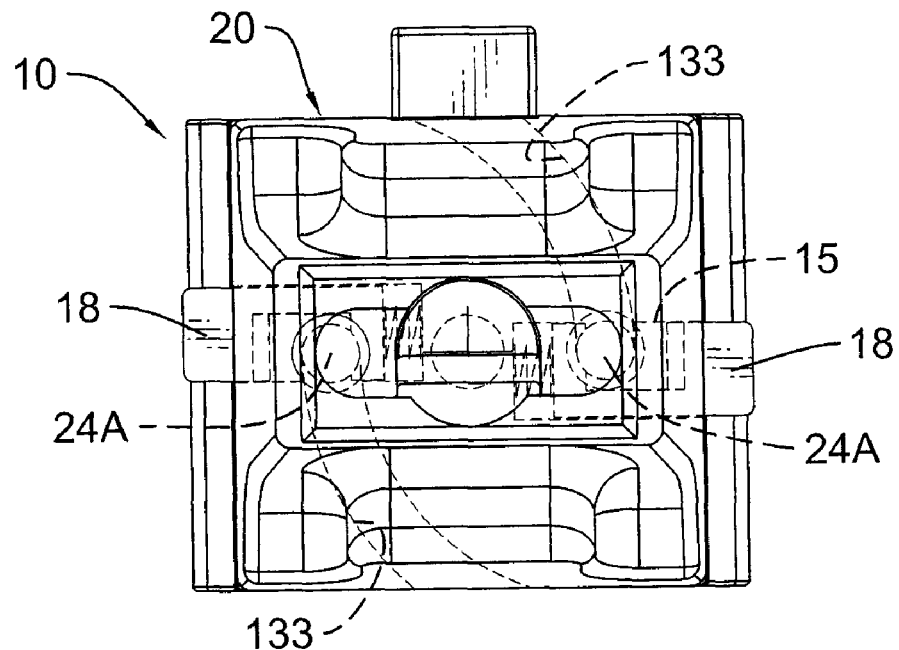
FIG. 9 is a side view in partial section of the positioning assembly in FIG. 8.
Figure 10:
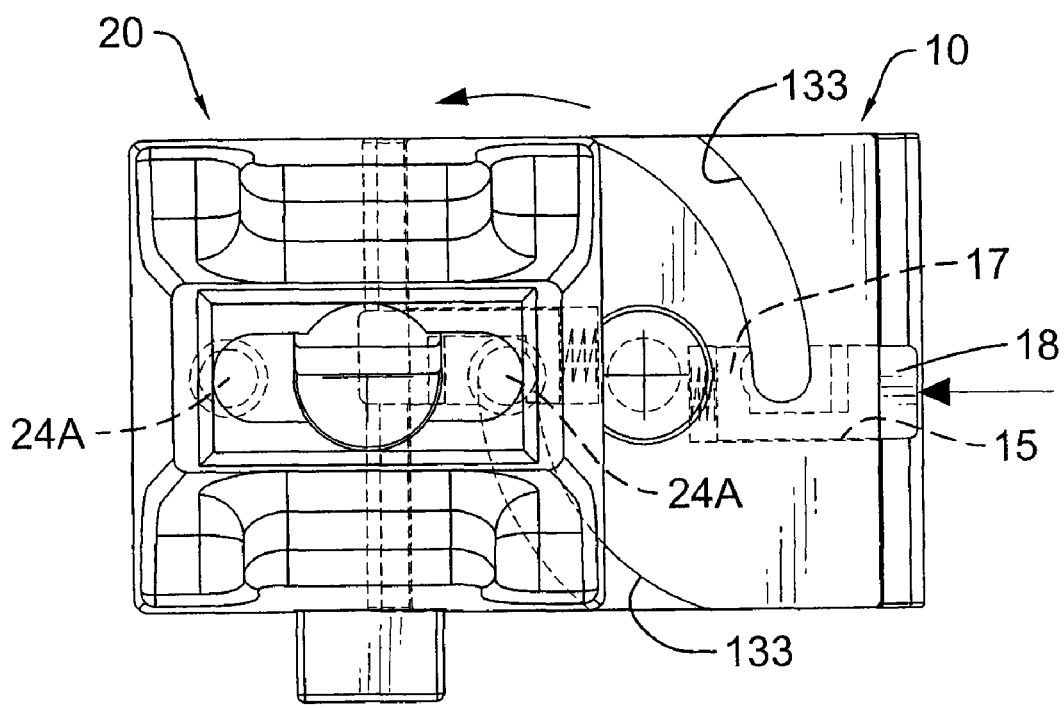
FIG. 10 is an operational side view of the positioning assembly in FIG. 9.
Figure 11:
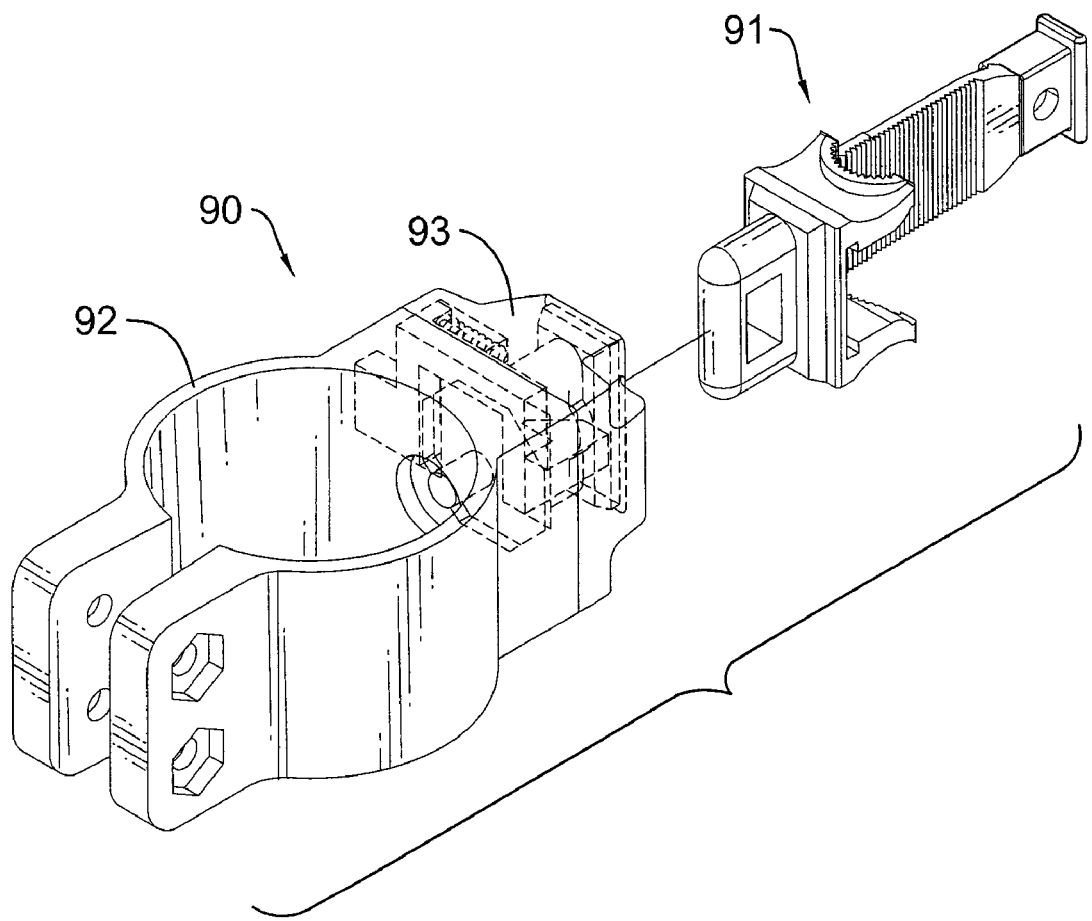
FIG. 11 is an exploded perspective view of a conventional positioning assembly for a bicycle lock in accordance with the prior art.

The base (13) may be mounted detachably on the rear side of the mounting segment (11) by a bolt and nut or may be formed on the rear side of the mounting segment (11). The base (13) has two opposite faces, a middle, a rear side, two through holes (133), two mounting recesses (15) and two openings (132) and may have two pinholes (131). With further reference to FIGS. 2, 9 and 10, the through holes (133) may be curved, are formed through the rear side of the base (13) near the middle. The mounting recesses (15) are formed in the base (13) parallel each other between the opposite faces and respectively communicate with the through holes (133). Wherein, the opposite faces may be top and bottom faces or two side faces of the base (13). The openings (132) are respectively formed through the opposite faces of the base (13) and communicate with the mounting recesses (15). The pinholes (131) are formed through the rear side of the base (13) and communicate with the mounting recesses (15) near the openings (132).

The pressing devices (14) are movably and respectively mounted in the mounting recesses (15) of the base (13), and each pressing device (14) has a spring (16) and a pressing arm (18) and may have an inserting pin (19).

The springs (16) are respectively mounted in the mounting recesses (15) of the base (13).

The pressing arms (18) are respectively movably mounted in the mounting recesses (15) of the base (13) and abut respectively with the springs (16). Each pressing arm (18) has an inner end, an outer end, a rear side, a middle, a mounting rod, a gap and a holding post (17) and may further have an elongated hole (181). The inner ends of the pressing arms (18) are mounted in the mounting recesses (15). The outer ends of the pressing arms (18) extend out of the openings (132) of the base (13). The mounting rods are formed on and protrude from the inner ends of the pressing arms (18) and are connected to the springs (16). The gaps are formed through the middle of the pressing arms (18). The holding posts (17) are formed on the pressing arms (18) in the gaps, and each holding post (17) has a free end extending a position corresponding to and aligning with a corresponding through hole (133) of the base (13). The elongated holes (181) are respectively formed through the rear sides of the pressing arms (181) near the outer ends and align with the pinholes (131) of the base (13).

The inserting pins (19) are respectively mounted in the pinholes (131) of the base (13) and are connected to the pressing arms (18) in the elongated holes (181).

The turning connector (20) is pivotally and detachably connected to the positioning frame (10) and has a front side, a rear side, a pivotal segment (21) and a linking segment (22).

The pivotal segment (21) is formed on the front side of the turning connector (20), is detachably and pivotally connected to the base (13) of the controlling segment (12) and has an outer side and two engaging elements (24, 24A). The outer side of the pivotal segment (21) faces to the rear side of the base (13).

Figure 5:
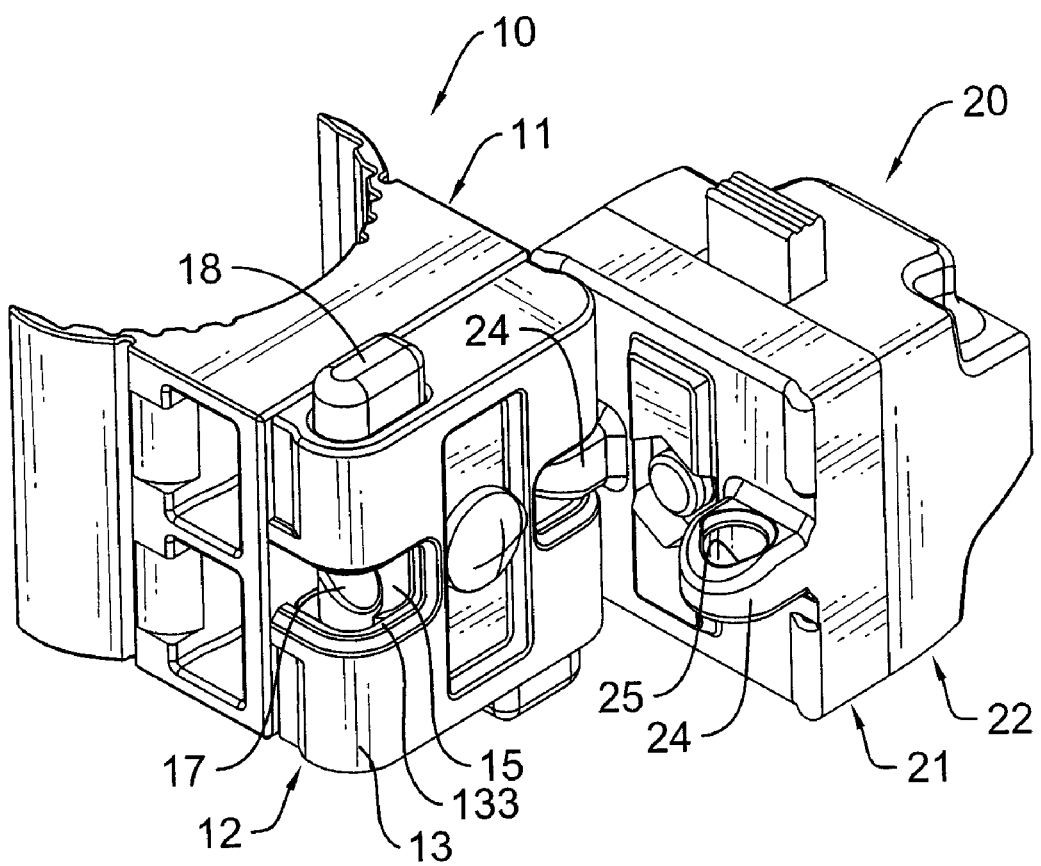
FIG. 5 is an operational perspective view of the positioning assembly in FIG. 1.
Figure 6:
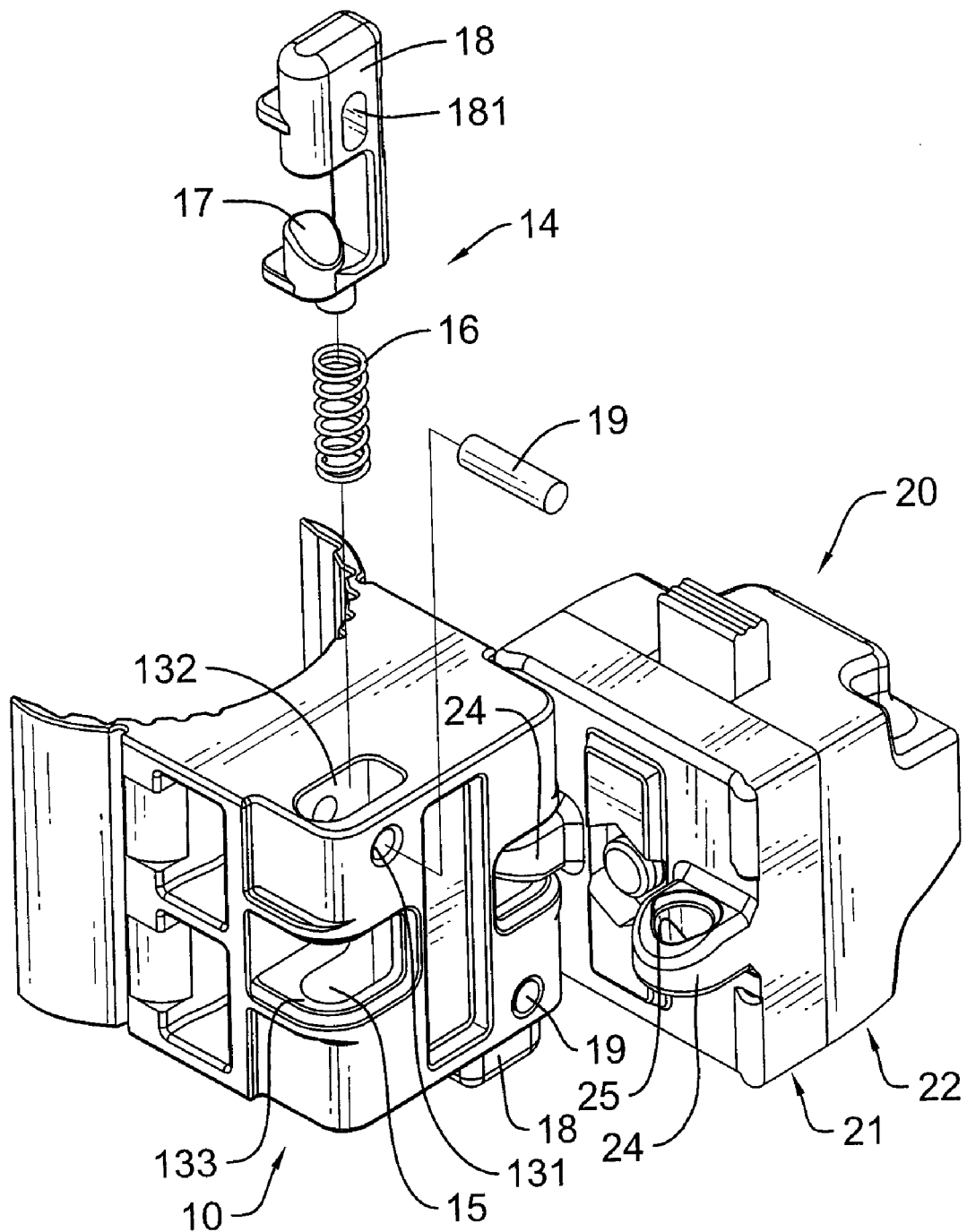
FIG. 6 is an exploded perspective view of a second embodiment of a positioning assembly for a bicycle lock in accordance with the present invention.
Figure 8:
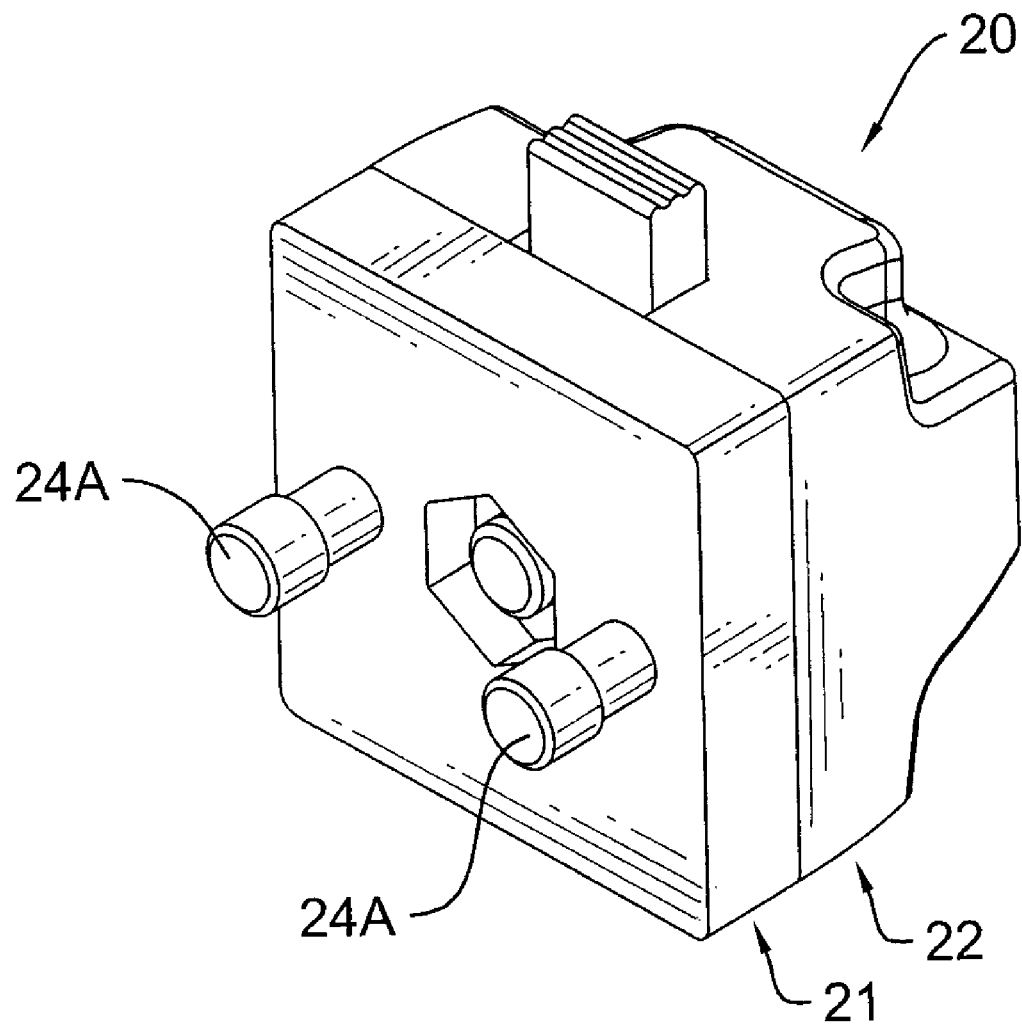
FIG. 8 is a perspective view of a fourth embodiment of a positioning assembly for a bicycle lock in accordance with the present invention.

The engaging elements (24) are formed on and protrude from the outer side of the pivotal segment (21), are respectively mounted in the mounting recesses (15) of the base (13) via the through holes (133) and engage the free ends of the holding posts (17) of the pressing arms (18). Consequently, the turning connector (20) is connected to the positioning frame (10) with the engaging elements (24) engaging the holding posts (17). With further reference to FIG. 5, each engaging element (24) further has an engaging hole (25) formed through the engaging element (24) to engage a corresponding holding post (17). With further reference to FIGS. 8, 9 and 10, each engaging element (24A) may be a post and is slidably mounted in a corresponding curved through holes (133) of the base (13). Therefore, the turning connector (20) can be rotated relative to the positioning frame (10) with the engaging elements (24A) moving along the curved through holes (133).

The linking segment (22) is formed on the rear side of the turning connector (20), is formed with the pivotal segment (21) and has an inner side, an outer side and an inserting hole (23). The inner side of the linking segment (22) is formed with the pivotal segment (21). The inserting hole (23) is formed in the outer side of the linking segment (22).

The linking element (30) is detachably connected to the turning connector (20) and has an inserting end and a connecting end. The inserting end of the linking element (30) is detachably mounted in the inserting hole (23) of the linking segment (22). The connecting end of the linking element (30) is used to connect the bicycle lock to the frame tube of the bicycle.

With further reference to FIGS. 1, 5, 6 and 7, the positioning assembly in accordance with the present invention can be mounted on a frame tube of a bicycle and connected to a bicycle lock with mounting the belt or the clamp of the mounting segment (11) securely around the frame tube and connecting the connecting end of the linking element (30) to the bicycle lock. Accordingly, the bicycle lock can be mounted on the bicycle with the positioning assembly.

Figure 3:
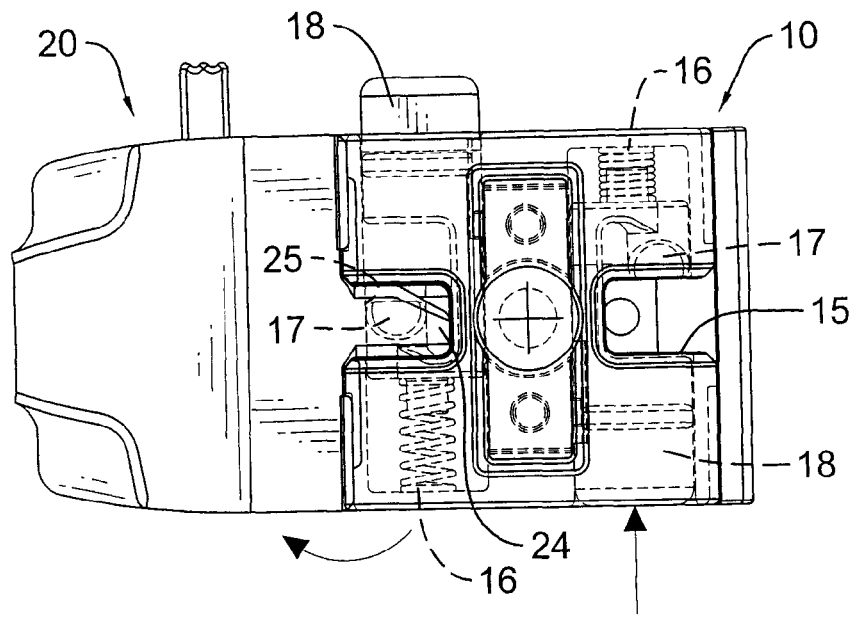
FIG. 3 is an operational side view of the positioning assembly in FIG. 1.
Figure 4:
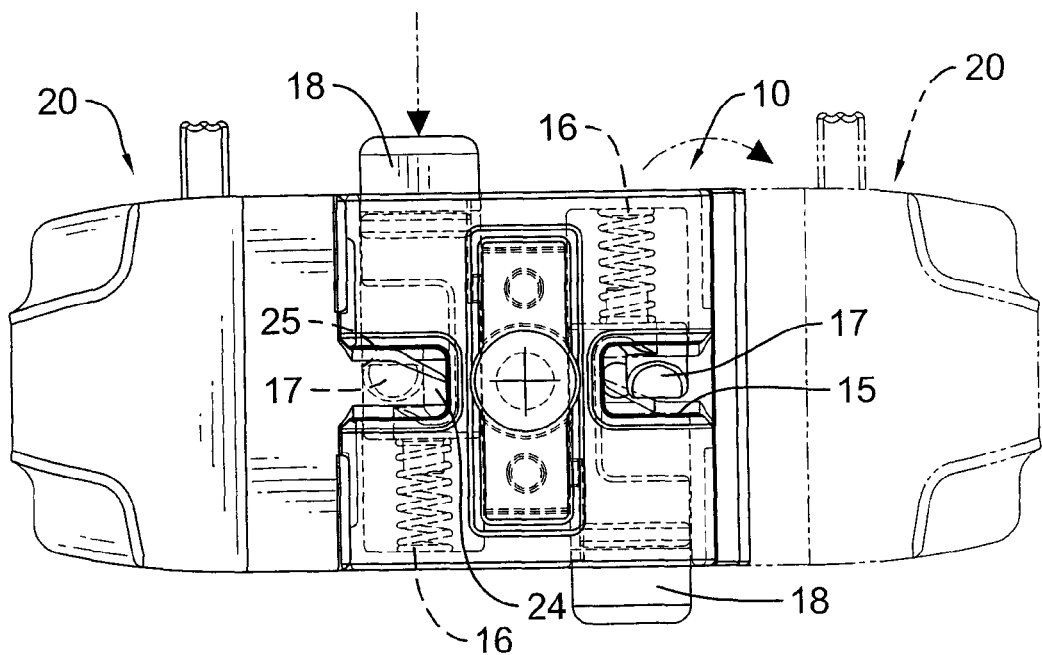
FIG. 4 is another operational side view of the positioning assembly in FIG. 1.

With further reference to FIGS. 3 and 4, the turning connector (20) can be pivotally moved relative to the positioning frame (10) by pressing one of the pressing arms (18) relative to the corresponding mounting recess (15) of the base (13) to make the holding post (17) on the pressing arm (18) disengaging from the engaging hole (25) of the corresponding engaging element (24). With the turning connector (20) being pivotally moved relative to the positioning frame (10), the linking element (30) that connected to the turning connector (20) can be adjusted in direction relative to the frame tube of the bicycle. Thus, to connect the bicycle lock to the linking element (30) can be prevented from being obstructed by the bicycle and is convenient in operation.

Furthermore, with further reference to FIGS. 9 and 10, when one of the pressing arms (18) is pressed, the holding post (17) on the pressed pressing arm (18) is disengaged from the post of the corresponding engaging element (24A). Consequently, the turning connector (20) can be rotated relative to the positioning frame (10) along the corresponding curved through hole (133). Thus, the linking element (30) that connected to the turning connector (20) can be adjusted in direction relative to the frame tube of the bicycle.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A positioning assembly for a bicycle lock having
   a positioning frame having
      a mounting segment having
         a front side; and
         a rear side; and
      a controlling segment being mounted on the mounting segment and having
         a base being on the rear side of the mounting segment and having
            two opposite faces;
            a middle;
            a rear side;
            two through holes being formed through the rear side of the base near the middle;
            two mounting recesses being formed in the base parallel each other between the opposite faces and respectively communicating with the through holes; and
            two openings being respectively formed through the opposite faces of the base and communicating with the mounting recesses; and two pressing devices being movably and respectively mounted in the mounting recesses of the base;

a turning connector being pivotally and detachably connected to the positioning frame and having
    a front side;
    a rear side;
    a pivotal segment being formed on the front side of the turning connector, being detachably and pivotally connected to the base of the controlling segment and having
        an outer side facing to the rear side of the base; and
        two engaging elements being formed on and protruding from the outer side of the pivotal segment, being respectively mounted in the mounting recesses of the base via the through holes and engaging the pressing devices; and
    a linking segment being formed on the rear side of the turning connector, being formed with the pivotal segment and having
        an inner side being formed with the pivotal segment;
        an outer side; and
        an inserting hole being formed in the outer side of the linking segment; and a linking element being detachably connected to the turning connector and having
    an inserting end being detachably mounted in the inserting hole of the linking segment; and
    a connecting end being used to connect the bicycle lock.

2. The positioning assembly as claimed in claim 1, wherein each pressing device further has
    a spring being mounted in one of the mounting recesses of the base; and
    a pressing arm being movably mounted in the corresponding mounting recess of the base, being abutted with the spring and having
        an inner end being mounted in the corresponding mounting recess;
        an outer end being extend out of a corresponding opening of the base;
        a rear side;
        a middle;
        a gap being formed through the middle of the pressing arm; and
        a holding post being formed on the pressing arm in the gap and having a free end extended a position corresponding to the through hole that communicating with the corresponding mounting recess of the base; and
    each engaging element further has an engaging hole being formed through the engaging element to engage the free end of a corresponding holding post.

3. The positioning assembly as claimed in claim 2, wherein the base further has two pinholes being formed through the rear side of the base and respectively communicating with the mounting recesses near the openings;
    each pressing arm further has an elongated hole being formed through the rear side of the pressing arm near the outer end and aligning with one of the pinholes of the base; and
    each pressing device further has an inserting pin being mounted in a corresponding one of the pinholes of the base and connected to the pressing arm in the elongated hole of the pressing device.

4. The positioning assembly as claimed in claim 3, wherein each pressing arm further has a mounting rod being formed on and protruding from the inner end of the pressing arm and being connected to the corresponding spring.

5. The positioning assembly as claimed in claim 4, wherein the mounting segment of the positioning frame further has a belt being mounted on the rear side.

6. The positioning assembly as claimed in claim 4, wherein the mounting segment of the positioning frame further has a C-shaped clamp being formed on the front side.

7. The positioning assembly as claimed in claim 4, wherein the base is formed on the rear side of the mounting segment.

8. The positioning assembly as claimed in claim 1, wherein each through hole of the base is curved;
    each pressing device further has
        a spring being mounted in one of the mounting recesses of the base; and
        a pressing arm being movably mounted in the corresponding mounting recess of the base, being abutted with the spring and each pressing arm having
            an inner end being mounted in the corresponding mounting recess;
            an outer end being extend out of a corresponding opening of the base;
            a rear side;
            a middle;
            a gap being formed through the middle of the pressing arms; and
            a holding post being formed on the pressing arm in the gap and having a free end extended out of the through hole that communicating with the corresponding mounting recess of the base; and
    each engaging element is a post and is slidably mounted in a corresponding curved mounting recess of the base.

9. The positioning assembly as claimed in claim 8, wherein the base further has two pinholes being formed through the rear side of the base and respectively communicating with the mounting recesses near the openings;
    each pressing arm further has an elongated hole being formed through the rear side of the pressing arm near the outer end and aligning with one of the pinholes of the base; and
    each pressing device further has an inserting pin being mounted in one of the pinholes of the base and connected to the pressing arm in the elongated hole of the pressing device.

10. The positioning assembly as claimed in claim 9, wherein each pressing arm further has a mounting rod being formed on and protruding from the inner end of the pressing arm and being connected to the corresponding spring.

11. The positioning assembly as claimed in claim 10, wherein the mounting segment of the positioning frame further has a belt being mounted on the rear side.

12. The positioning assembly as claimed in claim 10, wherein the mounting segment of the positioning frame further has a C-shaped clamp being formed on the front side.

13. The positioning assembly as claimed in claim 10, wherein the base is formed on the rear side of the mounting segment.

14. The positioning assembly as claimed in claim 1, wherein the mounting segment of the positioning frame further has a belt being formed on the front side.

15. The positioning assembly as claimed in claim 1, wherein the mounting segment of the positioning frame further has a C-shaped clamp being formed on the front side.

16. The positioning assembly as claimed in claim 1, wherein the base is formed on the rear side of the mounting segment.

* * * * *